United States Patent
Garre et al.

(10) Patent No.: US 10,288,447 B2
(45) Date of Patent: May 14, 2019

(54) MICROELECTROMECHANICAL SYSTEMS DEVICE TEST SYSTEM AND METHOD

(71) Applicant: FREESCALE SEMICONDUCTOR, INC., Austin, TX (US)

(72) Inventors: Philippe Garre, Tempe, AZ (US); Silvia Garre, Scottsdale, AZ (US)

(73) Assignee: NXP USA, Inc., Austin, TX (US)

( * ) Notice: Subject to any disclaimer, the term of this patent is extended or adjusted under 35 U.S.C. 154(b) by 201 days.

(21) Appl. No.: 15/336,035

(22) Filed: Oct. 27, 2016

(65) Prior Publication Data
US 2018/0120126 A1 May 3, 2018

(51) Int. Cl.
  *G01C 25/00* (2006.01)
  *G01C 19/5712* (2012.01)
  *G01P 21/00* (2006.01)
(52) U.S. Cl.
  CPC ....... *G01C 25/005* (2013.01); *G01C 19/5712* (2013.01); *G01P 21/00* (2013.01)
(58) Field of Classification Search
  CPC ............................ G01C 19/5712; G01P 21/00
  USPC .......................................................... 73/1.37
  See application file for complete search history.

(56) References Cited

U.S. PATENT DOCUMENTS 2,697,343 A  12/1954 Hirtreiter
9,157,928 B2  10/2015 Chen et al.
2009/0064778 A1* 3/2009 Metzger ................ G01V 7/00
                                                                 73/382 G
2011/0308296 A1  12/2011 Sasso et al.
2016/0047675 A1  2/2016 Tanenhaus et al.

FOREIGN PATENT DOCUMENTS

RU        2 494 345 C1    9/2013
WO   WO-2011/083511 A1   7/2011

OTHER PUBLICATIONS

RU 2494345 translation, Kalikhman, dated Sep. 27, 2013.*
Acutronic; "Angular Vibration Table 105-AVT"; Datasheet; retrieved from the internet http://www.acutronic.com/uploads/tx_AcutronicProducts/Datasheet-Angular-Vibration-Table-105-AVT.pdf; 2 pages (Oct. 25, 2016).

(Continued)

*Primary Examiner* — Eric S. McCall
*Assistant Examiner* — Timothy P Graves
(74) *Attorney, Agent, or Firm* — Charlene R. Jacobsen

(57) ABSTRACT

A system includes a rotary platform adapted to undergo oscillatory motion about a fixed point, a test fixture coupled to the rotary platform, the test fixture being adapted to receive a device-under-test, and an inertial sensor mounted to the rotary platform for providing a motion output signal indicative of the oscillatory motion. A controller is in communication with the rotary platform and inertial sensor. The controller receives the motion output signal and provides a drive signal to the rotary platform responsive to the motion output signal. The controller generates the drive signal in response a test profile and the motion output signal provides feedback of actual movement of the rotary platform. The motion output signal is input to the controller to ensure correspondence between the drive signal and the test profile. A multitude of differing validated environmental vibrational stimuli effects can be evaluated via a sense signal from the device.

6 Claims, 3 Drawing Sheets

(56) References Cited

OTHER PUBLICATIONS

Rashed, Mohammed Irfan et al; "Numerical Modeling, Testing and Bias Drift Analysis of MEMS Based Three-Axis Gyroscope for Accurate Angular Rate Estimation for Attitude Determination of Nano-Satellites"; 13th International Conference on Control, Automation and Systems; Gwangju, Korea; 6 page (Oct. 20-23, 2013).
Sakri, M.I., et al.; "Estimation of Fatigue-life of Electronic Packages Subjected to Random Vibration Load"; Defence Science Journal, vol. 59, No. 1; pp. 58-62 (Jan. 1, 2009).

* cited by examiner

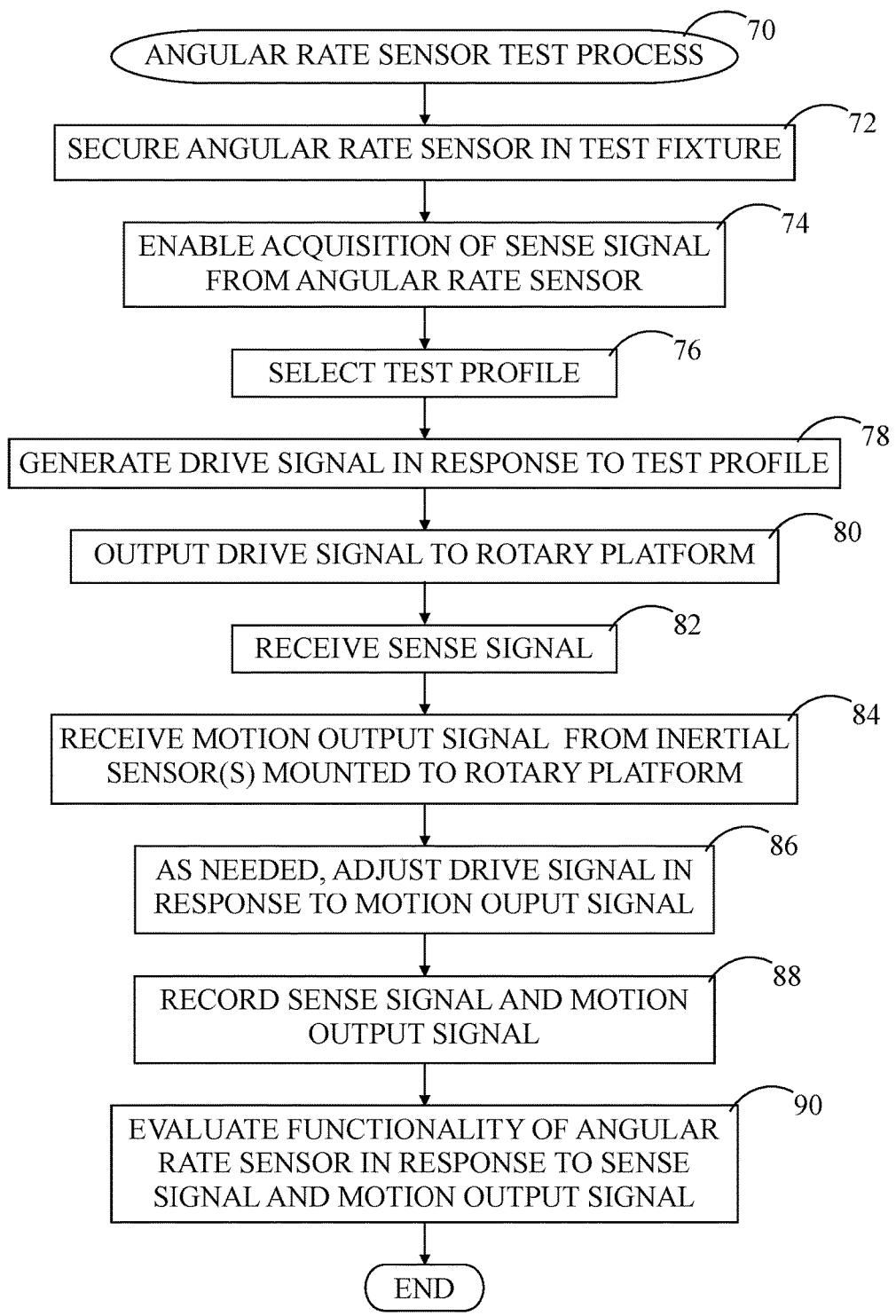

MICROELECTROMECHANICAL SYSTEMS DEVICE TEST SYSTEM AND METHOD

TECHNICAL FIELD OF THE INVENTION

The present invention relates generally to microelectromechanical systems (MEMS) device testing. More specifically, the present invention relates to testing MEMS angular rate sensors in an accurate and repeatable manner.

BACKGROUND OF THE INVENTION

Microelectromechanical systems (MEMS) technology has achieved wide popularity in recent years, as it provides a way to make very small mechanical structures and integrate these structures with electrical devices on a single substrate using conventional batch semiconductor processing techniques. One common application of MEMS is the design and manufacture of sensor devices. MEMS sensor devices are widely used in applications such as automotive, inertial guidance systems, household appliances, game devices, protection systems for a variety of devices, and many other industrial, scientific, and engineering systems. In particular, MEMS angular rate sensors are increasingly being adapted for use in active vehicle control within the rapidly growing advance driver assistance systems (ADAS) market of the automotive industry. Such use cases include, for example, facilitating antiskid control and electronic stability control in anti-rollover systems.

A MEMS angular rate sensor, alternatively referred to as a "gyroscope," "gyro sensor", "gyrometer," or "gyroscope sensor," is a sensor that senses angular speed or velocity around one or more axes. A MEMS angular rate sensor typically incorporates a vibrating mass which is continuously biased, or in movement, when powered. Due to their design and tiny size, MEMS angular rate sensors are highly sensitive to their environment. For example, angular rate sensors can be susceptible when exposed to diverse environmental stimulations resulting in a wide array of vibrational excitations. A set or combination of these can have the effects of instability, malfunction, or impaired output signals depending upon the design of the device. Consequently, such angular rate sensors require complex testing and performance characterization. However, prior art test systems have been unable to accurately and repetitively examine device characteristics and behaviors when exposed to variable angular rates.

BRIEF DESCRIPTION OF THE DRAWINGS

The accompanying figures in which like reference numerals refer to identical or functionally similar elements throughout the separate views, the figures are not necessarily drawn to scale, and which together with the detailed description below are incorporated in and form part of the specification, serve to further illustrate various embodiments and to explain various principles and advantages all in accordance with the present invention.

FIG. 4 shows a flowchart of an angular rate sensor test process in accordance with another embodiment.

DETAILED DESCRIPTION

In overview, embodiments disclosed herein entail a test system and methodology for testing angular rate sensors. More particularly, the test system and methodology enable rotational excitation of a device under test, such as a microelectromechanical systems (MEMS) angular rate sensor, in accordance with a variety of test profiles using a controller to generate controlled, measurable, and repetitive excitation in order to characterize the MEMS angular rate sensor. The test profiles can be suitably selected and the excitation is controlled via a feedback loop. Accordingly, characterization of a MEMS angular rate sensor can entail environmental excitation in the form of rotational sinusoidal vibration dwelling at a particular frequency, linear or logarithmic frequency sweep, mechanical shock, and so forth. Additionally, the test system and methodology may be used to test other devices, such as linear inertial sensors, with rotational sinusoidal vibration as the environmental excitation.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It should be understood that the use of relational terms, if any, such as first and second, top and bottom, and the like are used solely to distinguish one from another entity or action without necessarily requiring or implying any actual such relationship or order between such entities or actions.

Figure 1:
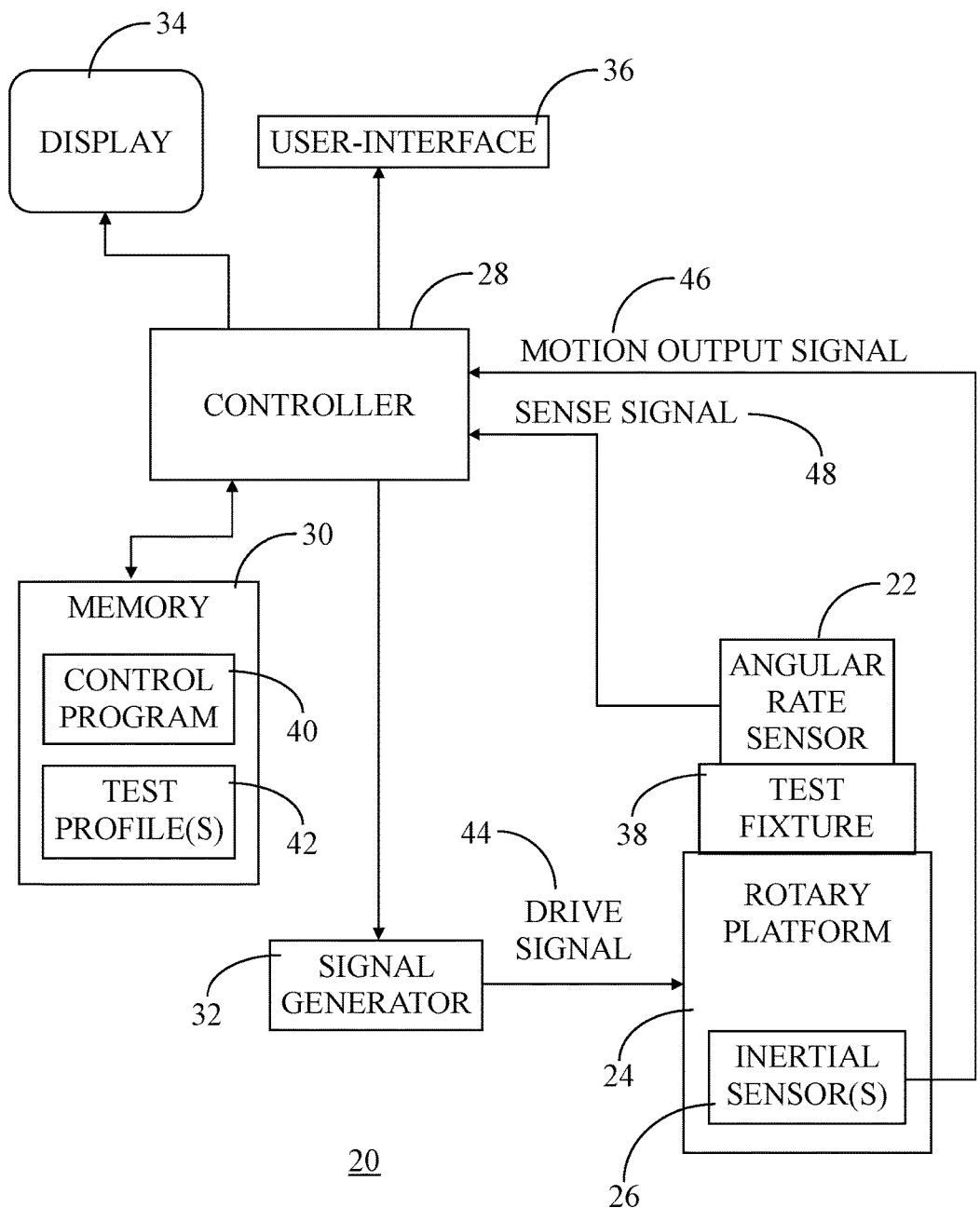
FIG. 1 shows a block diagram of a test system for testing an angular rate sensor in accordance with an embodiment.

Referring to FIG. 1, FIG. 1 shows a block diagram of a test system 20 for testing a MEMS angular rate sensor 22 in accordance with an embodiment. Test system 20 includes a rotary platform 24 and at least one inertial sensor 26 mounted to rotary platform 24. A controller 28 is in communication with rotary platform 24 and a memory component 30. Additionally, controller 28 may be in communication with a signal generator 32, a user display 34, and a user interface 36. User interface 36 can include a keyboard, touchscreen, mouse, or any other combination of components for enabling a user to enter commands to controller 28. A test fixture 38 is coupled to rotary platform 24. Test fixture 38 is adapted to receive at least one device to undergo testing utilizing test system 20. In this embodiment, the device to undergo testing is angular rate sensor 22.

In general, memory element 30 can include at least one control program 40 and one or more test profiles 42 stored therein. In an embodiment, control program 40 is executable by controller 28 in response to user commands entered via user interface 36. In one example, control program 40 may include a series of queries that allows a user to select one of test profiles 42 and thereafter vary certain parameters pertaining to the selected test profile 42. Of course, those skilled in the art will recognize that there may be great variation in user commands, user display, and/or structure of control program 40 and test profiles 42.

Control program 40 may be executed via controller 28 to generate a drive signal 44 for enabling rotary platform 24 to undergo oscillatory motion. For example, controller 28 may generate a digital signal in response to execution of control program 40 and the selection of one of test profiles 42. The digital signal may be communicated to signal generator 32 which may convert it to an analog signal, suitably amplify it, and/or otherwise process the signal to produce drive signal 44.

As rotary platform 24 undergoes oscillatory motion, inertial sensor(s) 26 provide a motion output signal 46 indicative of the oscillatory motion of rotary platform 24. Additionally, angular rate sensor 22 produces a sense signal 48 in response to the oscillatory motion. Motion output signal 46 is communicated to controller 28 in a closed feedback loop configuration. Thus, motion output signal 46 provides feedback to controller 28 of the actual movement of rotary platform 24. Motion output signal 46 may be input to controller 28 to ensure that drive signal 44 corresponds with the predetermined selected one of test profiles 42. Further, a difference between motion output signal 46 and drive signal 44 may be identified so as to provide a correction factor to drive signal 44. Thus, drive signal 44 may be provided to rotary platform 24 that is responsive to the actual movement of rotary platform 24, i.e., motion output signal 46.

Prior art test systems typically utilize an open loop approach with no feedback of the signal being applied. Accordingly, accuracy and repeatability could be adversely effected. By utilizing the closed feedback loop technique of test system 20, the accuracy of drive signal 44 may be enhanced. Moreover, by using controller 28 to generate controlled, measureable, and repetitive excitation (i.e., drive signal 44), the feedback and recordation of motion output signal 46 can be implemented to ensure that drive signal 44 is accurate up to a certain percent accuracy. Further, by utilizing a digital control scheme via control program 40 executed at controller 28 to generate drive signal 44, more complex and repeatable test profiles may be performed to test devices, such as MEMS angular rate sensor 22. And still further, since motion output signal 46 (representing the actual movement of rotary platform 24) is communicated to controller 28 along with sense signal 48, sense signal 48 can be compared with motion output signal 46 to determine phase delays and the like.

Figure 2:
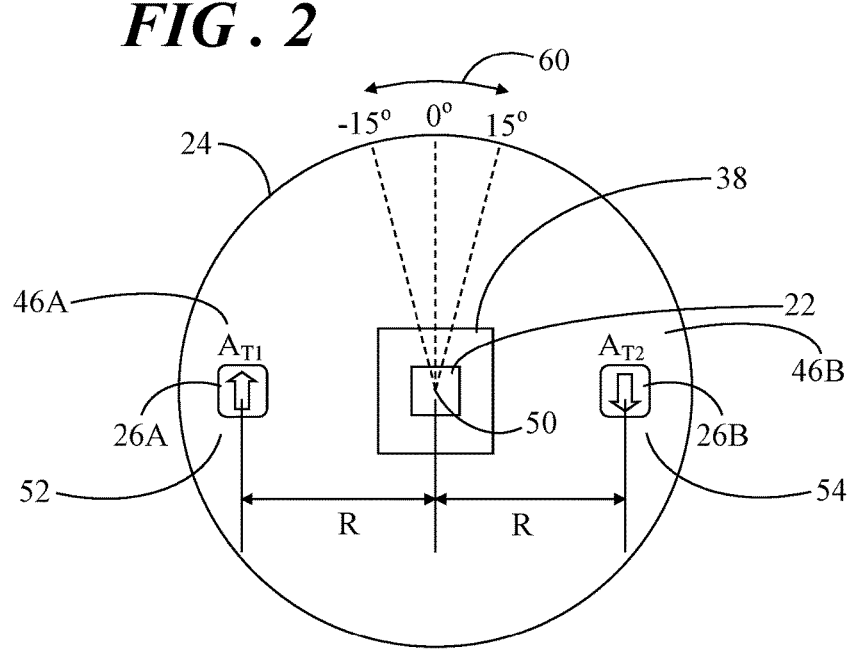
FIG. 2 shows a simplified top view of a rotary platform of the test system.

FIG. 2 shows a simplified top view of rotary platform 24 of test system 20 (FIG. 1). In this example, test fixture 38 with angular rate sensor 22 secured to it is positioned at centrally located pivot point 50 of rotary platform 24. In other embodiments, test fixture 38 with angular rate sensor 22 may be displaced away from pivot point 50, and in still other embodiments, multiple test fixtures 38 and angular rate sensors 22 may be secured to rotary platform 24.

Inertial sensors 26, labeled 26A and 26B, are mounted on or in rotary platform 24. Inertial sensors 26A and 26B may be linear accelerometers. As such, inertial sensor 26A may be a first linear accelerometer 26A mounted to rotary platform 24 at a first location 52 and inertial sensor 26B may be a second linear accelerometer 26B mounted to rotary platform 24 at a second location 54. Second location 54 is shifted one hundred eighty degrees about pivot point 50 from first location 52.

Motion output signals 46 in the form of a first tangential acceleration signal 46A, labeled $A_{T1}$, and a second tangential acceleration signal 46B, labeled $A_{T2}$, may be used to determine the rotational speed, i.e., angular velocity, of rotary platform 24. For example, the rotational speed of rotary platform 24 can be obtained using both first and second tangential acceleration signals 46A and 46B. In particular, angular acceleration can be computed, as follows:

$$\alpha = \frac{(A_{T1} + A_{T2})}{2R} \quad (1)$$

where $\alpha$ is angular acceleration defined as a function of the linear tangential acceleration, $A_{T1}$ and $A_{T2}$, and the radius, R. Thus, angular acceleration can be taken as an average of two linear acceleration readings divided by their distance, R, from the center of rotation.

Angular acceleration, $\alpha$, is the change in angular rate, $\omega$, over time. Thus, once the angular acceleration, $\alpha$, is known, the rotational speed (angular velocity) of rotary platform 24, $\omega$, can be obtained from the computed angular acceleration. In particular, the rotational speed, $\omega$, is the integral over a time period of angular acceleration, $\alpha$, as follows:

$$\omega = \int_{T_0}^{T_1} \alpha \, dt \quad (2)$$

Applying equation (1) to equation (2) yields the following:

$$\omega = \int_{T_0}^{T_1} \left( \frac{A_{T1} + A_{T2}}{2R} \right) dt \quad (3)$$

Consequently, in some embodiments, controller 28 can be used to actively integrate motion output signal 46, i.e., first tangential acceleration signal 46A, labeled $A_{T1}$, and a second tangential acceleration signal 46B, labeled $A_{T2}$, to determine actual movement of rotary platform 24. The use of controller 28 to actively integrate the acceleration motion response from inertial sensors 26A and 26B over a defined rolling time period can provide a real time angular rate response signal that can be used to evaluate sense signal 48 and/or can be used to ensure that drive signal 44 corresponds with the selected test profile 42. Although a pair of linear accelerometers are discussed herein for assessing the actual movement of rotary platform 24, alternative embodiments may use other inertial sensors and/or other quantities of linear accelerometers to produce motion output signal 46 indicative of the actual movement of rotary platform 24 that can be used in the closed feedback loop configuration of test system 20.

In FIG. 2, oscillatory motion of rotary platform 24 about pivot point 50 is demonstrated by a curved bi-directional arrow 60. In this illustration, oscillatory motion 60 has a magnitude of +/−fifteen degrees. That is, rotary platform 24 is being driven to undergo oscillatory motion 60 about a fixed point, i.e., pivot point 50. Those skilled in the art will recognize that other magnitudes of oscillatory motion 60 may be utilized. The signal outputs from first and second linear accelerometers 26A, 26B can be used to measure the actual characteristics of the motion of rotary platform 24 and, consequently, the motion that angular rate sensor 22 is being subjected to.

Figure 3:
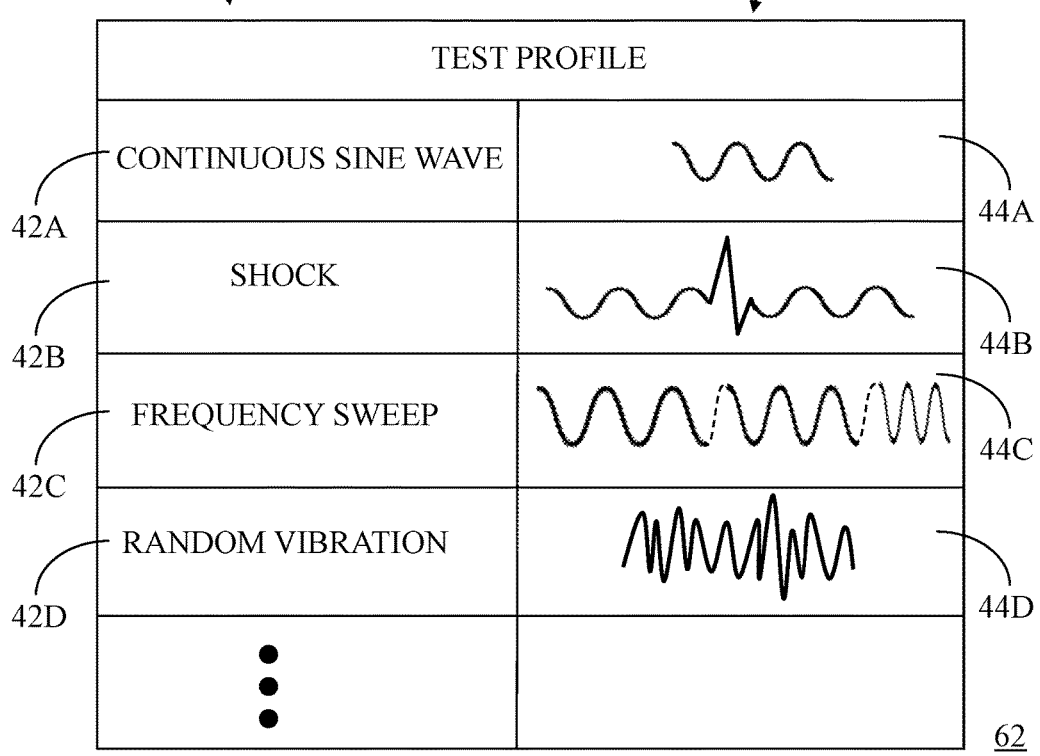
FIG. 3 shows a table of test profiles that may be executed using the test system.

FIG. 3 shows a table 62 of test profiles 42 that may be executed using test system 20. As mentioned previously, control program 40 (FIG. 1) is executable by controller 28 (FIG. 1) in response to user commands entered via user interface 36 (FIG. 1). In one example, control program 40 may include a series of queries that allows a user to select one of test profiles 42 and thereafter vary certain parameters pertaining to the selected test profile 42. These parameters may include, for example, a desired waveform, amplitude, initial and final frequencies, step size between discrete frequencies, and so forth.

In this example, a test profile 42 may be a continuous sine wave test profile 42A. Through the execution of control program 40 and the selection of continuous sine wave test profile 42A, controller 28 generates drive signal 44 in the form of a continuous frequency sine wave signal. In some embodiments, the frequency and amplitude may be selected and suitably entered by a user in accordance with a particular test protocol. This drive excitation is represented by drive signal 44A.

Another test profile 42 may be a shock test profile 42B. Through the execution of control program 40 and the selection of shock test profile 42B, controller 28 generates drive signal 44 in the form of a continuous frequency sine wave signal with a shock signal (i.e., a disruption in the oscillatory motion 60 and rapid change of signal amplitude) being superimposed upon the continuous frequency sine wave signal. This drive excitation is represented by drive signal 44B. Testing of angular rate sensor 22 using shock test profile 42B may be performed to obtain sense signal 48 (FIG. 1) from angular rate sensor 22 in order to characterize the functionality of angular rate sensor 22 in response to an external shock stimulus.

Yet another test profile 42 may be a frequency sweep test profile 42C. Through the execution of control program 40 and the selection of frequency sweep test profile 42C, controller 28 generates drive signal 44 in the form of sine wave signal at a series of discrete frequencies, where the sine wave signal is a continuous frequency signal for a predetermined duration at each of the discrete frequencies. This drive excitation is represented by drive signal 44C. The dashed lines associated with drive signal 44C denotes a change or step in the frequency in accordance with frequency sweep test profile 42C. In some embodiments, the frequency range, the discrete frequencies, and/or amplitude may be selected and suitably entered by a user in accordance with a particular test protocol. Testing of angular rate sensor 22 using frequency sweep test profile 42C may be performed to obtain sense signal 48 from angular rate sensor 22 when angular rate sensor 22 is subjected to a sinusoidal velocity whose frequency is changing from low frequencies to higher frequencies. The data collected during execution of frequency sweep test profile 42C (i.e., sense signal 48 over time) may be used to calculate the rolling average of the data, which is the offset. Accordingly, the offset can be accurately assessed to determine whether angular rate sensor 22 meets offset requirements.

Table 62 additionally includes another test profile 42 in the form of a random vibration test profile 42D. Through the execution of control program 40 and the selection of random vibration test profile 42D, controller 28 generates drive signal 44 by varying the amplitude and/or the frequency in a random or pseudorandom manner. This drive excitation is represented by drive signal 44D. Testing of angular rate sensor 22 using random vibration test profile 42D may be performed to obtain sense signal 48 from angular rate sensor 22 in order to assess the mechanical robustness of angular rate sensor 22.

Table 62 includes four example test profiles 42 for illustrative purposes. Through the use of a controller system, e.g., controller 28, as an input source to generate controlled, measurable (via the feedback loop), and repetitive excitation to rotary platform 24, a wide variety of test profiles 42 may alternatively or additionally be performed. By way of example, a logarithmic frequency sweep test profile 42 may be performed to characterize structural resonances and/or to assess performance of angular rate sensor 22 at resonant and roll-off frequencies. Such testing may be performed at final test in a production scenario. These additional test profiles 42 are not specified for brevity. However, they are denoted by ellipses in table 62.

Referring now to FIG. 4, FIG. 4 shows a flowchart of an angular rate sensor test process 70 in accordance with another embodiment. Angular rate sensor test process 70 is performed utilizing test system 20 (FIG. 1) with controller 28 being an input source for rotary platform 24. Accordingly, test system 20 shown in block diagram form in FIG. 1 may be referred to concurrent with angular rate sensor test process 40. Angular rate sensor test process 70 is discussed in connection with the characterization of a single angular rate sensor 22 for simplicity. It should be understood, however, that multiple angular rate sensors 22 may be tested concurrently with a test fixture and rotary platform that can accommodate multiple devices under test.

At a block 72, angular rate sensor 22 is suitably secured in test fixture 38 on rotary platform 24 with the sensing axis being aligned to detect oscillatory motion 60 (FIG. 2) of rotary platform 24. Of course, angular rate sensor 22 may be secured in test fixture 38, and thereafter, test fixture 38 may be secured to rotary platform 24. Conversely, test fixture 38 may first be secured to rotary platform 24, and thereafter, angular rate sensor 22 may be secured in test fixture 38.

The following blocks of angular rate sensor test process 70 may be performed when a user initiates execution of control program 40 at controller 28. Thus, at a block 74, controller 28 enables execution of sense signal 48 from angular rate sensor 22 to controller 28. At a block 76, one of test profiles 42 (FIG. 3) is selected by the user via control program 40. For example, icons for the various test profiles 42 may be provided to the user via display 34 from which the user may select a desired test profile 42 in accordance with certain testing requirements. Additionally, the user may specify particular test parameters such as amplitude, initial and final frequencies, step size between discrete frequencies, and so forth.

At a block 78, controller 28 generates drive signal 44 in response to the selected test profile 42 and at a block 80 drive signal 44 is output from controller 28 via signal generator 32 to rotary platform 24. Thereafter rotary platform 24 undergoes oscillatory motion 60 (FIG. 2) in accordance with the selected one of test profiles 42.

At a block 82, sense signal 48 (for example, an angular velocity) is received at controller 28 from angular rate sensor 22. Additionally, at a block 84, motion output signal 46 indicative of oscillatory motion 60 of rotary platform 24 is received at controller 28 from inertial sensors(s) 26 mounted to rotary platform 24. At a block 86, drive signal 44 may be adjusted or otherwise corrected, as needed, in response to motion output signal 46. Thus, motion output signal 46 provides closed loop feedback of the actual movement of rotary platform 24. Further, drive signal 44 may be generated (i.e., adjusted or corrected) in response to motion output signal 46 to ensure that drive signal 44 corresponds to the predetermined selected one of test profiles 42.

At a block 88, sense signal 48 and motion output signal 46 may be recorded at controller 28. For example, sense signal 48 and motion output signal 46 may be suitably timestamped so that they correlate with one another in time. Further, motion output signal 46 in the form of angular acceleration may be suitably converted to angular velocity and thereafter be recorded at controller 28. Controller 28 is represented by a single block in FIG. 1 for simplicity. However, it should be understood that controller 28 represents one or more hardware and software computing systems for controlling the drive excitation of rotary platform 24 and for receiving motion output signal 46 and sense signal 48.

In response to block 88, the functionality of angular rate sensor 22 is evaluated using, for example, sense signal 48 and motion output signal 46 at a block 90. Thereafter, angular rate sensor test process 70 ends. The type of evaluation that takes place at block 90 depends upon the one or more test profiles 42 that were executed. The various test profiles 42 may be performed to evaluate the accuracy of angular rate sensor 22, to measure an offset shift, to assess the mechanical robustness of angular rate sensor 22, to evaluate angular rate sensor 22 for structural resonances, to assess the performance of angular rate sensor 22 at the resonant frequency and roll-off frequency, and so forth. Further, this evaluation can be performed for one or a multitude of angular rate sensors 22 in a highly controlled, measurable, and repeatable manner. Additionally, test system records and test output can be provided to a user to substantiate the drive excitation accuracy.

It is to be understood that certain ones of the process blocks depicted in FIG. 4 may be performed in parallel with each other or with performing other processes. In addition, it is to be understood that the particular ordering of the process blocks depicted in FIG. 4 may be modified, while achieving substantially the same result. Accordingly, such modifications are intended to be included within the scope of the inventive subject matter.

Thus, a test system and methodology for testing angular rate sensors are disclosed herein. An embodiment of a test system comprises a rotary platform adapted to undergo oscillatory motion about a fixed point, an inertial sensor mounted to the rotary platform for providing a motion output signal indicative of the oscillatory motion, and a controller in communication with the rotary platform and the inertial sensor, the controller being configured to receive the motion output signal and provide a drive signal to the rotary platform responsive to the motion output signal.

An embodiment of a method for testing a device comprises securing a device in a test fixture coupled to a rotary platform, the rotary platform being adapted to undergo oscillatory motion about a fixed point, generating a drive signal at a controller in response to a predetermined test profile, the controller being in communication with the rotary platform, and providing the drive signal from the controller to the rotary platform, the drive signal producing the oscillatory motion of the rotary platform. The method further comprises receiving, at the controller, a motion output signal from an inertial sensor mounted to the rotary platform, the motion output signal being indicative of the oscillatory motion, wherein the motion output signal provides feedback of actual movement of the rotary platform, and the drive signal is generated in response to the motion output signal to ensure that the drive signal corresponds with the predetermined test profile.

Another embodiment of a test system comprises a rotary platform adapted to undergo oscillatory motion about a fixed point, a test fixture coupled to the rotary platform, the test fixture being adapted to receive an angular rate sensor, a linear accelerometer mounted to the rotary platform for providing a motion output signal indicative of the oscillatory motion, and a controller in communication with the rotary platform and the linear accelerometer, the controller being configured to receive the motion output signal and provide a drive signal to the rotary platform responsive to the motion output signal, wherein the controller is configured to generate the drive signal in response to a predetermined test profile, and the motion output signal provides feedback of actual movement of the rotary platform, the motion output signal being input to the controller to ensure that the drive signal corresponds with the predetermined test profile.

The embodiments described herein enable rotational excitation of a microelectromechanical systems (MEMS) angular rate sensor in accordance with a variety of test profiles. In particular, a controller is used to generate controlled, measurable, and repetitive excitation in order to characterize the MEMS angular rate sensor. The test profiles can be suitably selected and the excitation can be controlled via a closed feedback loop. Thus, characterization of a MEMS angular rate sensor can entail environmental excitation in the form of rotational sinusoidal vibration dwelling at a particular frequency, linear or logarithmic frequency sweep, mechanical shock, random vibration, and so forth.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for testing a device comprising:
   securing a device in a test fixture coupled to a rotary platform, said rotary platform being adapted to undergo oscillatory motion about a fixed point;
   generating a drive signal at a controller in response to a predetermined test profile, said controller being in communication with said rotary platform, wherein said predetermined test profile produces said drive signal comprising a frequency sweep sine wave signal, said frequency sweep sine wave signal being characterized by a series of discrete frequencies, each of said discrete frequencies being continuous for a predetermined duration;
   providing said drive signal from said controller to said rotary platform, said drive signal producing said oscillatory motion of said rotary platform; and
   receiving, at said controller, a motion output signal from an inertial sensor mounted to said rotary platform, said motion output signal being indicative of said oscillatory motion, wherein said motion output signal provides feedback of actual movement of said rotary platform, and said drive signal is generated in response to said motion output signal to ensure that said drive signal corresponds with said predetermined test profile.

2. The method of claim 1 further comprising:
   recording, at said controller, a sense signal output from said device; and
   evaluating, at said controller, a functionality of said device using said sensing signal and said motion output signal.

3. The method of claim 1 wherein said device is an angular rate sensor.

4. The method of claim 1 further comprising executing a control program at said controller, said control program specifying said predetermined test profile utilized to generate said drive signal.

5. A method for testing a device comprising:

securing a device in a test fixture coupled to a rotary platform, said rotary platform being adapted to undergo oscillatory motion about a fixed point generating a drive signal at a controller in response to a predetermined test profile, said controller being in communication with said rotary platform, wherein said predetermined test profile produces said drive signal comprising a shock signal superimposed on a continuous frequency sine wave signal;

providing said drive signal from said controller to said rotary platform, said drive signal producing said oscillatory motion of said rotary platform; and receiving, at said controller, a motion output signal from an inertial sensor mounted to said rotary platform, said motion output signal being indicative of said oscillatory motion, wherein said motion output signal provides feedback of actual movement of said rotary platform, and said drive signal is generated in response to said motion output signal to ensure that said drive signal corresponds with said predetermined test profile.

6. A method for testing a device comprising:

securing a device in a test fixture coupled to a rotary platform, said rotary platform being adapted to undergo oscillatory motion about a fixed point generating a drive signal at a controller in response to a predetermined test profile, said controller being in communication with said rotary platform, wherein said predetermined test profile produces said drive signal comprising a random drive signal having at least one of an amplitude and a frequency that varies in a random or pseudorandom manner during a test procedures;

providing said drive signal from said controller to said rotary platform, said drive signal producing said oscillatory motion of said rotary platform; and receiving, at said controller, a motion output signal from an inertial sensor mounted to said rotary platform, said motion output signal being indicative of said oscillatory motion, wherein said motion output signal provides feedback of actual movement of said rotary platform, and said drive signal is generated in response to said motion output signal to ensure that said drive signal corresponds with said predetermined test profile.

* * * * *